United States Patent
Zhou

(10) Patent No.: US 8,964,745 B2
(45) Date of Patent: Feb. 24, 2015

(54) SPB BASED MULTICAST FORWARDING METHOD AND SPBM BRIDGE

(71) Applicant: Hangzhou H3C Technologies Co., Ltd., Hangzhou, Zhejiang (CN)

(72) Inventor: Wan Zhou, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 14/355,211

(22) PCT Filed: Dec. 13, 2012

(86) PCT No.: PCT/CN2012/086519
§ 371 (c)(1),
(2) Date: Apr. 30, 2014

(87) PCT Pub. No.: WO2013/097609
PCT Pub. Date: Jul. 4, 2013

(65) Prior Publication Data
US 2014/0369352 A1    Dec. 18, 2014

(30) Foreign Application Priority Data
Dec. 27, 2011    (CN) .............................. 201110448185

(51) Int. Cl.
*H04L 12/28* (2006.01)
*H04L 12/56* (2006.01)
*H04L 12/18* (2006.01)
(52) U.S. Cl.
CPC .................................... *H04L 12/185* (2013.01)
USPC ........................................... 370/390; 370/389

(58) Field of Classification Search
CPC ....................................................... H04L 12/185
USPC .................. 370/389, 390, 352, 353, 401, 391
See application file for complete search history.

(56) References Cited

U.S. PATENT DOCUMENTS

| | | | |
|---|---|---|---|
| 8,743,875 B2 * | 6/2014 | Khera et al. | 370/390 |
| 8,804,722 B2 * | 8/2014 | Appalla et al. | 370/390 |
| 8,867,367 B2 * | 10/2014 | Allan | 370/238 |
| 2006/0209829 A1 | 9/2006 | Lo et al. | |
| 2013/0077625 A1 * | 3/2013 | Khera et al. | 370/390 |
| 2013/0077627 A1 * | 3/2013 | Appalla et al. | 370/390 |
| 2013/0195111 A1 * | 8/2013 | Allan et al. | 370/395.53 |
| 2013/0279503 A1 * | 10/2013 | Chiabaut, Jerome | 370/389 |

FOREIGN PATENT DOCUMENTS

CN    102413059    4/2012
WO    WO-2013-097609 A1    7/2013

OTHER PUBLICATIONS

International Search Report and Written Opinion dated Mar. 21, 2013 issued on PCT Patent Application No. PCT/CN2012/086519 filed on Dec. 13, 2012, The State Intellectual Property Office, rhe P.R. China.

* cited by examiner

*Primary Examiner* — Chuong T Ho
(74) *Attorney, Agent, or Firm* — Patent Law Group LLP

(57) ABSTRACT

Examples of a SPB based multicast forwarding method are disclosed. Bridges in a SPBM network perform a multicast monitoring process, learn about multicast router and members of the IP multicast group, and notify other bridges in the SPBM network of the information through a SPB-ISIS LSP. A SPBM bridge in the SPBM network receives and parses the SPB-ISIS LSP, and configures the ingress and egress of the bridge, so as to guide the forwarding of IP multicast packets.

15 Claims, 5 Drawing Sheets

For any SPBM bridge in a SPT set, when the SPBM bridge determines that it is a SPBM bridge connected To an IP multicast source, the SPBM bridge selects one SPSourceID for the IP multicast group from multiple SPSourceIDs preallocated locally at the SPBM bridge, and generates a SPBM multicast group address of the IP multicast group according to the selected SPSourceID. ⟵ 201

↓

The SPBM bridge sends other SPBM bridges a LSP that contains the selected SPSourceID and a multicast identity indicating that the SPBM bridge Is connected to a multicast source. When the SPBM bridge receives a SPB-ISIS LSP that contains a multicast identity indicating that the SPBM bridge sending the SPB-ISIS LSP is connected to an IP multicast member, the SPBM bridge configures the SPBM bridge's interface connected to the IP multicast member as an egress of a SPBM multicast group. When the SPBM bridge receives an IP multicast packet sent by the IP multicast source, the SPBM bridge encapsulates the IP multicast packet into a SPBM multicast frame according to the SPBM multicast group address and forwards the SPBM multicast frame through the egress. ⟵ 202

↓

When determining that the SPBM bridge is a SPBM bridge connected to an IP multicast member, the SPBM bridge sends other SPBM bridges a SPB-ISIS LSP that contains a multicast identity indicating that the SPBM bridge is connected to an IP multicast member. When the SPBM bridge receives a SPB-ISIS LSP that contains a multicast identity indicating that the SPMB bridge sending the SPB-ISIS LSP is connected to an IP multicast source, the SPBM bridge generates a SPBM multicast group address according to the SPSourceID contained in the SPB-ISIS LSP, and configures the SPBM bridge's interface connected to the IP multicast source as an ingress of the SPBM multicast group. When the SPBM bridge receives a SPBM multicast frame from the ingress of the SPBM multicast group, the SPBM bridge decapsulates the SPBM multicast frame into an IP multicast packet and forwards the IP multicast packet to the IP multicast member. ⟵ 203

Figure 2

SPB BASED MULTICAST FORWARDING METHOD AND SPBM BRIDGE

CROSS-REFERENCE TO RELATED APPLICATIONS

The present application is a 371 application of International Application No. PCT/CN2012/086519 filed on Dec. 13, 2012 and entitled "SPB Based Multicast Forwarding Method and SPBM Bridge," which claims the benefit of Chinese Patent Application No. 201110448185.9 filed on Dec. 27, 2011.

BACKGROUND

Shortest Path Bridging (SPB) is an extension of Multiple Spanning Tree Protocol (MSTP), and shares link states in a network through Intermediate System to Intermediate System (ISIS) intra-domain routing information exchange protocol. Nodes in the network calculate the shortest path among the nodes at the same time. The SPB may be applied to a metro Ethernet or a data center Ethernet (also called Converged Enhanced Ethernet (CEE)). The SPB has the advantages of 802.1ah, and may be deployed in a metro network or a campus network.

SPB has two implementation modes: a Q-in-Q mode called a SPB-Virtual Local Area Network ID (SPBV), which is very complex and is not widely applied at the present, and a MAC-in-MAC mode called a Shortest Path Bridging MAC (SPBM), which is widely applied at the present.

Bridges configured with ISIS instances that have the same Area ID constitute a Domain, and bridges that have the same configuration abstract constitute a Region. One Domain includes one or more Regions. The boundary of Region is recognized automatically according to primary and secondary Multiple Spanning tree configuration Information Digests (MCIDs) contained in a Shortest Path Tree Bridge Protocol Data Unit (SPT BPDU) and an ISIS Hello Protocol Data Unit (IIH PDU) packets, and a mode for packet forwarding in the region is set by configuring a Virtual Local Area Network (VLAN) instance mapping relationship. The mode of packet forwarding may be Internal Spanning Tree (IST)/0, SPBM/4092, SPBV/4093, Traffic Engineer (TE)/4094, Multiple Spanning Tree Instance (MSTI)/Other.

BRIEF DESCRIPTION OF THE DRAWINGS

Features of the present disclosure are illustrated by way of example and not limited in the following figure(s), in which like numerals indicate like elements, in which:

FIG. 2 is a flowchart illustrating a procedure of forwarding an IP multicast packet according to an example of the present disclosure;

DETAILED DESCRIPTION

For multicast streams in any Region of a SPBM network, broadcast, unknown unicast, and unknown multicast should be forwarded based on a service instance's forwarding tree to SPBM bridges listed in the service instance. For IP multicast, when only some of the SPBM bridges have IP multicast members of the IP multicast, the IP multicast stream may only be forwarded to the devices having the IP multicast members.

Figure 1:
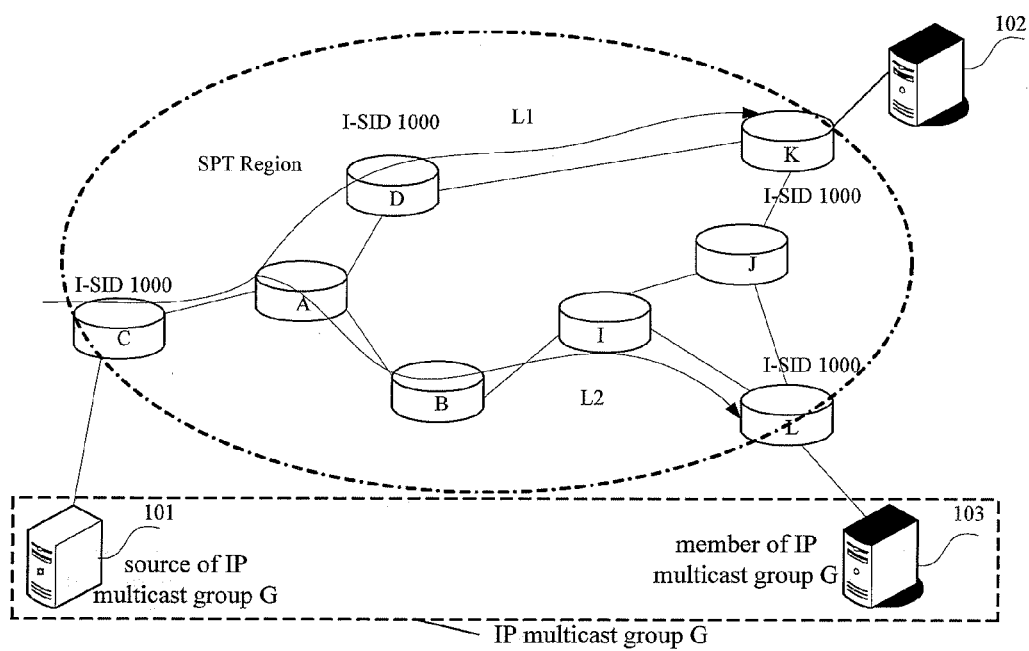
FIG. 1 is a schematic diagram illustrating the structure of a SPBM network where an IP multicast packet is forwarded.

FIG. 1 is a schematic diagram illustrating the structure of a SPBM network where an IP multicast packet is forwarded. As shown in FIG. 1, a multicast router 101 is a source of an IP multicast group G connected to a SPBM bridge C, a device 103 is a member of the IP multicast group G connected to a SPBM bridge L, a device 102 is an IP multicast member or a multicast router, but is not a member or source of the IP multicast group G, and the SPBM bridges L, C and K are all configured with a service instance I-SID1000. Since the SPBM bridges L, C and K are all configured with the service instance I-SID1000, the IP multicast stream of the IP multicast group G reaches the SPBM bridges K and L along with a multicast tree of L1 and L2, and the SPBM bridge K discards the IP multicast stream when it finds there is no member of the IP multicast group G at its location. Therefore, the IP multicast stream reaches a SPBM bridge having no member of the IP multicast group G.

In order to make the object, technical solution and merits of the present disclosure clearer, the present disclosure will be illustrated in detail hereinafter with reference to the accompanying drawings and specific examples.

According to an example of the present disclosure, a SPB based multicast forwarding method is provided. The method is applied to a set of SPTs of each service instance. A Shortest Path Source ID (SPSourceID) allocation protocol is run to preallocate multiple SPSourceIDs to each SPBM bridge configured with a service instance, where each SPBM bridge is allocated different SPSourceIDs.

FIG. 2 is a flowchart illustrating a method for forwarding an IP multicast packet according to an example of the present disclosure, which includes following blocks.

Block 201, for any SPBM bridge in a SPT set, when the SPBM bridge determines that it is a SPBM bridge connected to an IP multicast source, the SPBM bridge selects one SPSourceID for the IP multicast group from multiple SPSourceIDs preallocated locally at the SPBM bridge, and generates a SPBM multicast group address of the IP multicast group according to the selected SPSourceID.

Block 202, the SPBM bridge sends other SPBM bridges a SPB-ISIS Link Status Packet (LSP) that contains the selected SPSourceID and a multicast identity indicating that the SPBM bridge is connected to a multicast source. When the SPBM bridge receives a SPB-ISIS LSP that contains a multicast identity indicating that the SPBM bridge sending the SPB-ISIS LSP is connected to an IP multicast member, the SPBM bridge configures the SPBM bridge's interface connected to the IP multicast member as an egress of a SPBM multicast group. When the SPBM bride receives an IP multicast packet sent by the IP multicast source, the SPBM bridge encapsulates the IP multicast packet into a SPBM multicast frame according to the SPBM multicast group address and forwards the SPBM multicast frame through the egress.

In this block, a method for the SPBM bridge to determine that it is a SPBM bridge connected to an IP multicast source may include:

monitoring an Internet Group Monitoring Protocol (IGMP) query packet sent by a multicast router, and, when a local Ethernet port receives the IGMP query packet, learning that the local Ethernet port is a port of the multicast router of the IP multicast group;

performing a multicast monitoring process, and when learning that a local Ethernet port is a port of a multicast router of the IP multicast group, determining that the SPBM bridge is a SPBM bridge connected to the IP multicast source.

The SPBM bridge monitors an IGMP member report packet sent by an IP multicast member, and, when a local SPBM port receives the IGMP member report packet, learns that the local SPBM port is a port of the IP multicast member of the IP multicast group, where the local SPBM port is the SPBM bridge's interface connected to the IP multicast member.

The SPBM port in this example may be a virtual tunnel port, which is a port for connecting the SPBM bridge with a backbone network.

Block 203, when determining that the SPBM bridge is a SPBM bridge connected to an IP multicast member, the SPBM bridge sends other SPBM bridges a SPB-ISIS LSP that contains a multicast identity indicating that the SPBM bridge is connected to an IP multicast member. When the SPBM bridge receives a SPB-ISIS LSP that contains a multicast identity indicating that the SPBM bridge sending the SPB-ISIS LSP is connected to an IP multicast source, the SPBM bridge generates a SPBM multicast group address according to the SPSourceID contained in the SPB-ISIS LSP, and configures the SPBM bridge's interface connected to the IP multicast source as an ingress of the SPBM multicast group. When the SPBM bridge receives a SPBM multicast frame from the ingress of the SPBM multicast group, the SPBM bridge decapsulates the SPBM multicast frame into an IP multicast packet and forwards the IP multicast packet to the IP multicast member.

In this block, a method for the SPBM bridge to determine that it is a SPBM bridge connected to an IP multicast member may include:

monitoring an IGMP member report packet sent by an IP multicast member, and, when a local Ethernet port receives the IGMP member report packet, learning that the local Ethernet port is a port of the IP multicast member of the IP multicast group;

performing a multicast monitoring process, and, when learning that a local Ethernet port is a port of the IP multicast member of the IP multicast group, determining that the SPBM bridge is a SPBM bridge connected to the IP multicast member.

After determining it is an SPBM bridge connected to an IP multicast member, the SPBM bridge further monitors the IGMP query packet sent by the multicast router, and, when a local SPBM port receives the IGMP query packet, the SPBM bridge learns that the local SPBM port is a port of the multicast router of the IP multicast group, where the local SPBM port is the SPBM bridge's interface connected to the IP multicast source.

When a local SPBM port of a SPBM bridge that has determined it is an SPBM bridge connected to an IP multicast member receives an IGMP member report packet from another SPBM bridge, the SPBM bridge discards the IGMP member report packet.

The method for forwarding an IP multicast stream will be illustrated in detail hereinafter with reference to the accompanying drawings and examples.

Figure 3:
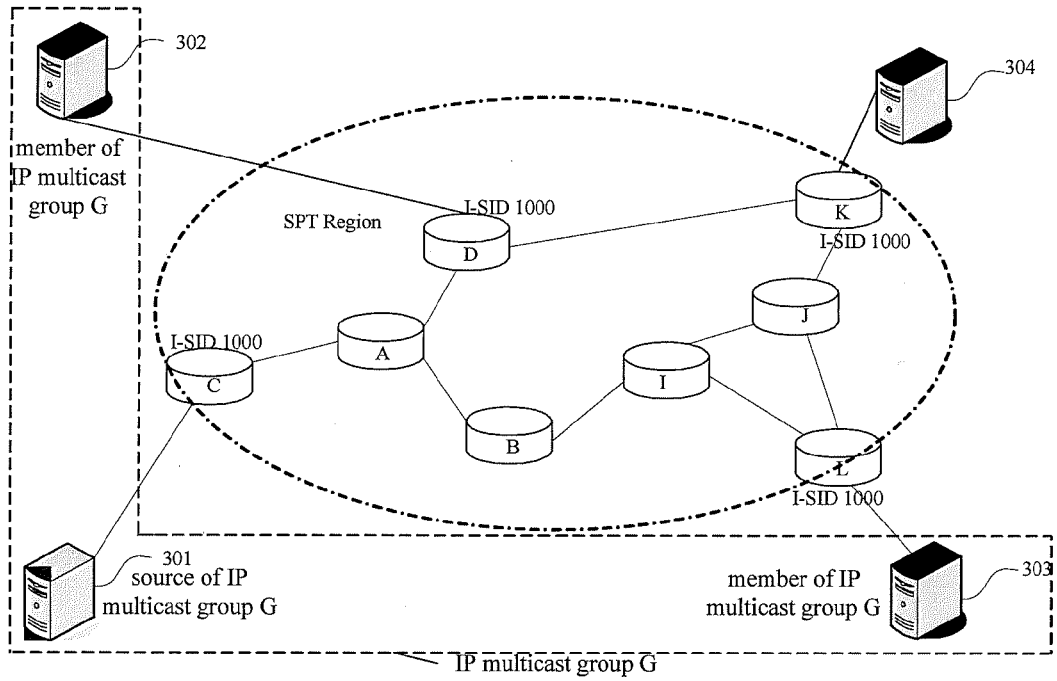
FIG. 3 is a schematic diagram illustrating the structure of a Shortest Path Tree (SPT) tree according to an example of the present disclosure.

According to the conventional SPBM protocol, a SPT set for forwarding an IP multicast stream is created for each service instance. FIG. 3 is a schematic diagram illustrating the structure of a SPT tree according to an example of the present disclosure. As shown in FIG. 3, the SPT of the service instance 1000 is used for forwarding broadcast, unknown unicast, and unknown multicast. In a specific example, the SPBM bridges are all called bridges for short. Suppose a multicast router 301 connected to a bridge C is a source of an IP multicast group A, and a member device 302 connected to a bridge D and a member device 303 connected to a bridge L are members of the IP multicast group A. A device 304 connected with a bridge K is neither a member of the IP multicast group G nor the source of the IP multicast group A, but may be a member or source of another IP multicast group. Bridges A, B, I and J neither connect to the source of the IP multicast group G nor the members of the IP multicast group A, and are not configured with a service instance.

Since the IP multicast group G forwards a packet according to a dedicated SPT, it needs to allocate a new SPSourceID to each SPBM bridge that can be coupled to the multicast router, i.e., the SPBM bridges configured with the service instance 1000. To ensure the dedicated SPT tree is quickly created, the SPSourceID allocation protocol is run to preallocate multiple unique SPSourceIDs to each SPBM bridge. The SPSourceIDs allocated to each SPBM bridge are provided to the SPBM bridges in the SPT through SPB-ISIS.

As shown in FIG. 3, bridges configured with a service instance include the bridges C, D, L, and K. Suppose the allocation result of each bridge is as follows:
the bridge C: 5 SPSourceIDs, named as 1-5,
the bridge D: 5 SPSourceIDs, named as 6-10,
the bridge K: 5 SPSourceIDs, named as 11-15, and
the bridge L: 5 SPSourceIDs, named as 16-20.

Each SPBM bridge runs a multicast monitoring protocol, monitors an IGMP packet, and learns of the IP multicast source and the IP multicast members in the network.

Figure 4:
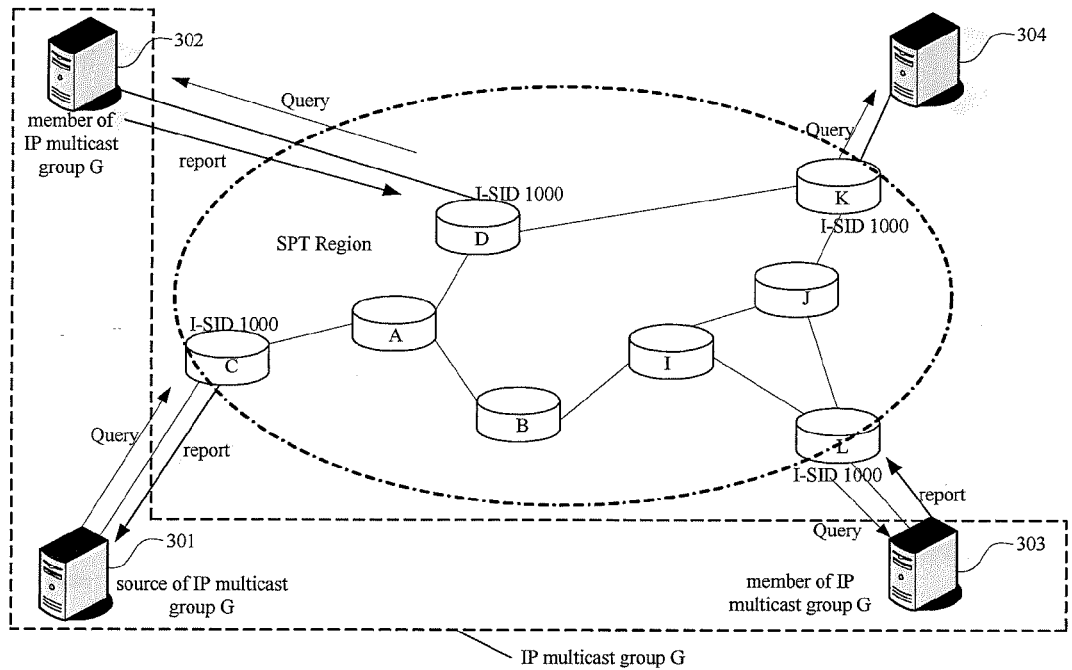
FIG. 4 is a schematic diagram illustrating the structure of a SPBM network where each SPBM bridge in a SPT tree monitors an Internet Group Management Protocol (IGMP) packet according to an example of the present disclosure.

FIG. 4 is a schematic diagram illustrating the structure of a SPBM network where each SPBM bridge in a SPT tree monitors an IGMP packet according to an example of the present disclosure. If the source of the IP multicast group G is located at the bridge C, the multicast router 301 sends the IGMP query packet, where the IGMP query packet reaches bridges configured with the service instance 1000 through the SPT of the service instance 1000, and then is sent out.

The bridge C monitors the IGMP query packet, and, when a local Ethernet port of the bridge C receives the IGMP query packet, the bridge C learns that the local Ethernet port is a port of the multicast router. The bridges D, K and L monitors the IGMP query packet, and if local SPBM ports of the bridges D, K and L receive the IGMP query packet, the bridges D, K and L learn that the local SPBM ports are ports of the multicast router. The bridges A, B, I and J cannot monitor the IGMP query packet, thus do not process the IGMP query packet, and also do not process the IGMP member report packet mentioned hereinafter.

In FIG. 4, a member device sends the IGMP member report packet, where the IGMP member report packet reaches bridges configured with the service instance 1000 through the SPT of the service instance 1000 and then is sent out. If the bridge L receives the IGMP member report packet sent by the bridge D, the bridge L discards the IGMP member report packet because the SPBM port is the port of the multicast router. Similarly, the bridge D discards the IGMP member report packet received from the bridge L, the bridge K discards the IGMP member report packets received from the bridges D and L. Since the bridge K is not connected to a member of the IP multicast group A, the bridge K does not send the IGMP member report packet and does not learn the port of the IP multicast member.

As shown in FIG. 4, the ports of multicast group members of each bridge are described as follows.

The bridge C monitors for an IGMP member report packet sent by an IP multicast member, and, when a local SPBM port of the bridge C receives an IGMP member report packet, the bridge C learns that the local SPBM port is a port of the IP multicast member. The bridges D, K or L monitors for an IGMP member report packet sent by an IP multicast member, and, when local SPBM ports of the bridges D, K or L receive the IGMP member report packet, the bridges D, K or L learn that the local SPBM ports are ports of the IP multicast member. The bridges A, B, I and J cannot monitor the IGMP member report packet, and thus do not process the IGMP member report packet.

When each SPBM bridge performing the multicast monitoring process learns that a local Ethernet port is a port of the multicast router of the IP multicast group, the SPBM bridge allocates the IP multicast group a SPSourceID which has been preallocated locally at the SPBM bridge and generates the SPBM multicast group address of the IP multicast group according to the allocated SPSourceID. The SPBM bridge notifies other bridges in the SPBM network of the multicast source allocation information through a SPB-ISIS LSP. The multicast source allocation information may include an ID of the service instance, an IP multicast group address, a multicast identity and the SPSourceID. The multicast identity indicates that the SPBM bridge is connected to a multicast source.

In FIG. 4, if the bridge C learns that a local Ethernet port is a port of the IP multicast group 224.1.1.1, the bridge C allocates SPSourceID=2 to the IP multicast group and notifies other bridges of the SPSourceID. The notified information includes the ID of the service instance=1000, the IP multicast group address=224.1.1.1, the multicast identity=Source, and the SPSourceID=2.

Figure 5:
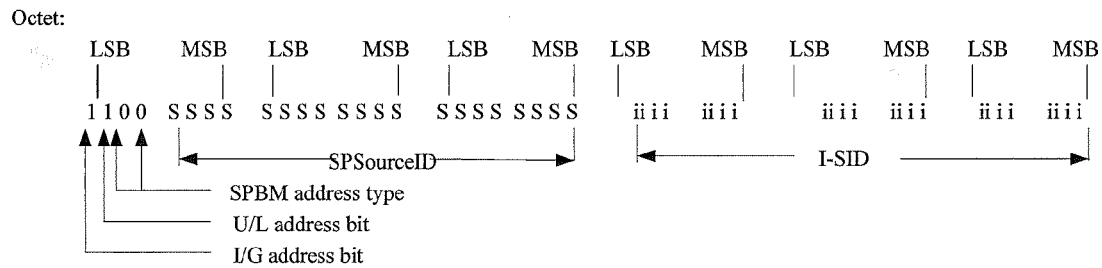
FIG. 5 is a schematic diagram illustrating the definition of a SPBM multicast address according to an example of the present disclosure.

The SPBM multicast group address of the IP multicast group is generated according to the allocated SPSourceID. FIG. 5 is a schematic diagram illustrating the definition of a SPBM multicast address according to an example. As shown in FIG. 5, the SPBM multicast group address of the IP multicast group is 1100-0010-1000. The multicast group address is a binary tree. In order to be convenient for applications, the SPBM multicast group address is recorded as C-0002-0008 in hexadecimal.

When each SPBM bridge performing the multicast monitoring process learns that a local Ethernet port is a port of the IP multicast member, the SPBM bridge notifies other bridges in the SPBM network of the IP multicast group information through a SPB-ISIS LSP. The notified information may include the ID of the service instance, the IP multicast group address, and the multicast identity.

In FIG. 4, the information notified by the bridge L includes the ID of the service instance=1000, the IP multicast group address=224.1.1.1, and the multicast identity=Member. The information notified by bridge D includes the ID of the service instance=1000, the IP multicast group address=224.1.1.1, and the multicast identity=Member.

Figure 6:
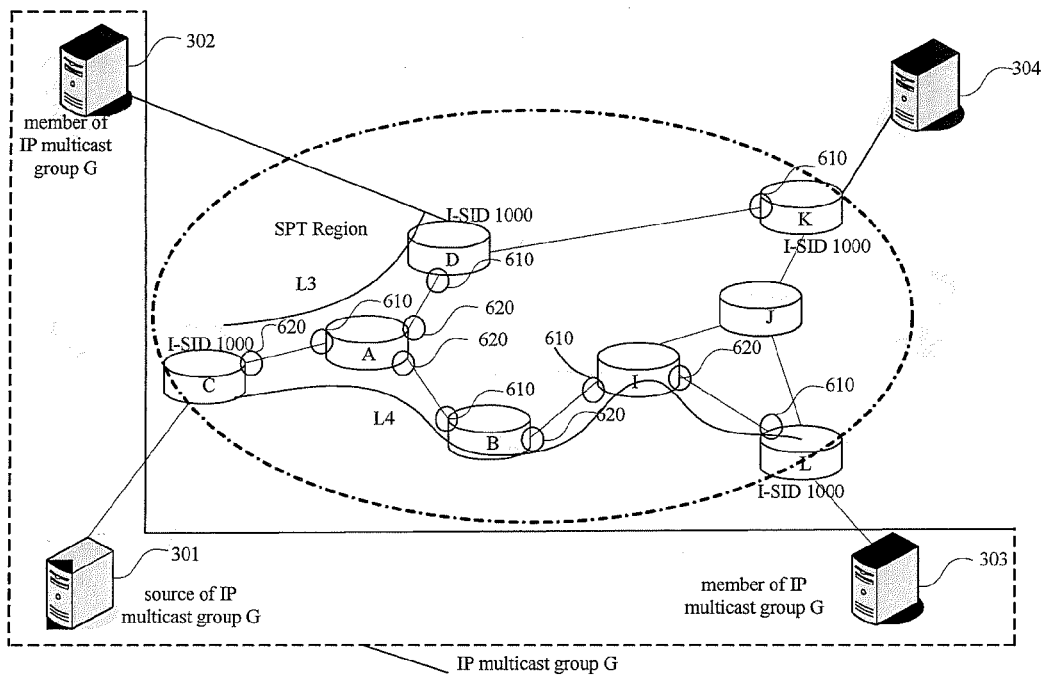
FIG. 6 is a schematic diagram illustrating the structure of a SPBM network where each bridge determines a special multicast tree of an Internet Protocol (IP) multicast group in accordance with a Link Status Packet (LSP) in an example of the present disclosure.

FIG. 6 is a schematic diagram illustrating the structure of a SPBM network where each bridge determines a dedicated multicast tree of an IP multicast group in accordance with a LSP in an example of the present disclosure. In FIG. 6, bridges except the bridge C receive and analyze a SPB-ISIS LSP sent by the bridge C, and generate a SPBM multicast group address 1100-0010-1000 of the IP multicast group according to the ID of the service instance and the SPSourceID contained in the SPB-ISIS LSP.

Each bridge performs following operations according to the multicast information contained in the received SPB-ISIS LSP.

When the multicast information contained in the SPB-ISIS LSP received by the bridge includes the multicast identity=Source, it indicates that the other bridge sending the SPB-ISIS LSP is connected to a multicast source. The bridge receiving the SPB-ISIS LSP performs SPT calculation, and, when the bridge determines it is a node in the SPT, the bridge configures the bridge's interface connected to the IP multicast source as an ingress of the SPBM multicast group, where the bridge's interface connected to the IP multicast source is a root port of the SPT. When performing SPT calculation, the bridges A, B, D, K, I and L are SPBM bridges in the SPT, and the bridges' interfaces connected to the bridge C are configured as an ingress 610 of the SPBM multicast group 1100-0010-1000. The bridge J is not a SPBM bridge of the SPT, and the interface of the bridge J is not configured.

When the multicast information contained in the SPB-ISIS LSP received by the bridge includes the multicast identity=Member, it indicates that the other bridge sending the SPB-ISIS LSP is connected to an IP multicast member. The bridge receiving the SPB-ISIS LSP performs SPT calculation, and, when the bridge determines it is a node in the SPT, the bridge configures the bridge's interface as an egress of the IP multicast group, where the bridge's interface is far away from the IP multicast source (that is, a designated port) and faces the bridge sending the SPB-ISIS LSP. While performing SPT calculation, when the bridges A and C receive a SPB-ISIS LSP sent by the bridge D, the bridges A and C are SPBM bridges in the SPT and they configure the interfaces connected to the bridge D as an egress 620 of the SPBM multicast group 1100-0010-1000. When the bridges I, B, A and C receive a SPB-ISIS LSP sent by the bridge L, the bridges I, B, A and C are SPBM bridges in the SPT, and configure the interfaces connected to the bridge L as an egress 620 of the SPBM multicast group 1100-0010-1000. The interfaces of other bridges are not configured.

Herein, the performing SPT calculation may for example include:

performing Shortest Past First (SPF) calculation by taking a certain SPBM bridge as a root node, generating a spanning tree with equal cost paths, and then performing Equal Cost Tree (ECT) decision according to the spanning tree to obtain a SPT without ring, where the SPT is composed of links and nodes.

The bridge C that configures an egress of the IP multicast group and whose IP multicast source is located locally at the bridge C generates a multicast item. The multicast item is used for storing information including the service instance, the IP multicast group address, the SPBM multicast group address, the local SPBM port is the port of the multicast router, and the egress information. The bridge C associates the multicast item with a Backbone VLAN (B-VLAN) corresponding to the service instance, and issues the multicast item to a data plane, so as to guide the forwarding of multicast data stream.

The bridges A, B and I that configure egresses and ingresses of the IP multicast group respectively generate a multicast item. The multicast item is used for storing the service instance, the IP multicast group address, the SPBM multicast group address, the ingress information, and the egress information. The bridges A, B and I respectively associate the multicast item with the B-VLAN corresponding to the service instance, and issue the multicast item to the data plane, so as to guide the forwarding of multicast data stream.

The bridges D and L that configure ingresses of the IP multicast group and whose IP multicast members are located locally at bridges D and L, respectively, generate a multicast item. The multicast item is used for storing the service instance, the IP multicast group address, the SPBM multicast group address, the ingress information, and the local Ethernet port is the port of the IP multicast member. The bridge D and L respectively associate the multicast item with the B-VLAN corresponding to the service instance, and issues the multicast item to the data plane, so as to guide the forwarding of multicast data stream.

The bridge K does not generate a multicast item when the bridge K has configured an ingress of the IP multicast group and there is no IP multicast member located locally at the bridge K. Since the bridge D does not configure an egress through which the IP multicast traffic can reach the bridge K, the IP multicast traffic is unable to be sent to the bridge K.

After receiving the IP multicast traffic sent by the multicast source, each bridge forwards the IP multicast traffic according to the multicast item that is associated with the B-VLAN corresponding to the service instance and contained in the IP multicast traffic. L3 and L4 in FIG. 6 is a dedicated IP multicast forwarding tree in the example, which is a subset of the SPT of the service instance 1000 in which the bridge C is taken as a root. As can be seen from FIG. 6, the IP multicast traffic sent by the IP multicast source will not be sent to the bridge K configured with the service instance.

Figure 7:
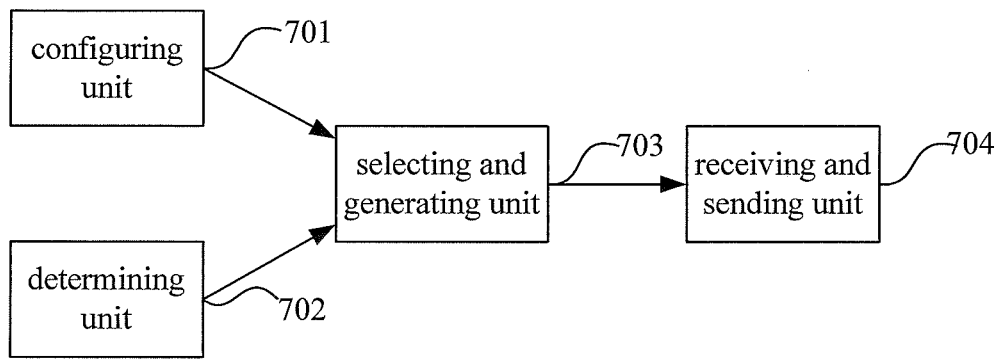
FIG. 7 is a schematic diagram illustrating the structure of a SPBM bridge connected to an IP multicast source according to an example of the present disclosure.

Based on the above idea, an example is provided for a SPBM bridge, which is used for implementing SPB based multicast forwarding. FIG. 7 is a schematic diagram illustrating the structure of a SPBM bridge connected to an IP multicast source according to an example of the present disclosure. The SPBM bridge includes a configuring unit 701, a determining unit 702, a selecting and generating unit 703, and a receiving and sending unit 704.

The configuring unit 701 runs a SPSourceID assigning protocol to preallocate multiple SPSourceIDs to the SPBM bridge where the configuring unit 701 is located.

The determining unit 702 determines if the SPBM bridge where the determining unit 702 is located is a SPBM bridge connected to an IP multicast source.

The selecting and generating unit 703, when the determining unit 702 determines that the SPBM bridge where the determining unit 702 is located is a SPBM bridge connected to an IP multicast source, selects one SPSourceID for the IP multicast group from the multiple SPSourceIDs preallocated by the configuring unit 701, and generates a SPBM multicast group address of the IP multicast group according to the selected SPSourceID.

The receiving and sending unit 704 sends other SPBM bridges a SPB-ISIS LSP that contains the SPSourceID selected by the selecting and generating unit 703 and a multicast identity indicating that the SPBM bridge is connected to an IP multicast source. When receiving a SPB-ISIS LSP that contains a multicast identity indicating that the SPBM bridge sending the SPB-ISIS LSP is connected to an IP multicast member, the receiving and sending unit 704 configures the SPBM's interface connected to the IP multicast member as an egress of the SPBM multicast group. When receiving an IP multicast packet sent by the IP multicast source, the receiving and sending unit 704 encapsulates the IP multicast packet into a SPBM multicast frame according to the SPBM multicast group address, and forwards the SPBM multicast frame.

In an example, the determining unit 702 monitors an IGMP query packet sent by a multicast router; if a local Ethernet port of the SPBM bridge where the determining unit 702 is located receives an IGMP query packet, the determining unit 702 learns that the local Ethernet port is a port of a multicast router of the IP multicast group. The determining unit 702 performs a multicast monitoring process. When learning that a local Ethernet port is a port of a multicast router of the IP multicast group, the determining unit 702 determines that the SPBM bridge where the determining unit 702 is located is a SPBM bridge connected to an IP multicast source.

In an example, the determining unit 702 further monitors an IGMP member report packet sent by an IP multicast member. When a local SPBM port of the SPBM bridge where the determining unit 702 is located receives the IGMP member report packet, the determining unit 702 learns that the local SPBM port is a port of an IP multicast member of the IP multicast group, where the local SPBM port is the SPBM bridge's interface connected to the IP multicast member.

Figure 8:
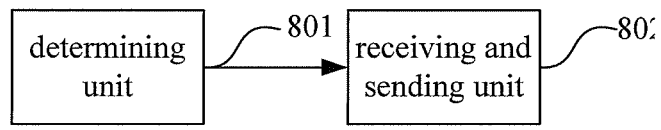
FIG. 8 is a schematic diagram illustrating the structure of a SPBM bridge connected to an IP multicast member according to an example of the present disclosure.

The SPBM bridge may be used for implementing SPB based multicast forwarding. FIG. 8 is a schematic diagram illustrating the structure of a SPBM bridge connected to an IP multicast member according to an example of the present disclosure. The SPBM bridge includes a determining unit 801 and a receiving and sending unit 802.

The determining unit 801 determines that the SPBM bridge where the determining unit 801 is located is a SPBM bridge connected to an IP multicast member.

The receiving and sending unit 802, when the determining unit 801 determines that the SPBM bridge where the determining unit 801 is located is a SPBM bridge connected to an IP multicast member, sends other SPBM bridges a SPB-ISIS LSP that contains a multicast identity indicating that the SPBM bridge connects with an IP multicast member. When receiving a SPB-ISIS LSP that contains a multicast identity indicating that the SPBM bridge sending the SPB-ISIS LSP connects with an IP multicast source, the receiving and sending unit 802 generates a SPBM multicast group address according to the SPSourceID contained in the SPB-ISIS LSP, and configures the bridge's interface connected to the IP multicast source as an ingress of the SPBM multicast group. When receiving a SPBM multicast frame from the ingress of the SPBM multicast group, the receiving and sending unit 802 decapsulates the SPBM multicast frame into an IP multicast packet and forwards the IP multicast packet to the IP multicast member.

In an example, the determining unit 801 monitors an IGMP member report packet sent by an IP multicast member. When a local Ethernet port of the SPBM bridge where the determining unit 801 is located receives an IGMP member report packet, the determining unit 801 learns that the local Ethernet port is a port of an IP multicast member of the IP multicast group. The determining unit 801 performs a multicast monitoring process, and, when learning that a local Ethernet port is a port of an IP multicast member of the IP multicast group, determines that the SPBM bridge is a SPBM bridge connected to an IP multicast member.

In an example, the determining unit 801 further monitors an IGMP query packet sent by the multicast router. When a local SPBM port of the SPBM bridge where the determining unit 801 is located receives an IGMP query packet, the determining unit 801 learns that the local SPBM port is a port of a multicast router of the IP multicast group, where the local SPBM port is the SPBM bridge's interface connected to an IP multicast source.

In an example, the determining unit 801 further discards an IGMP member report packet when a local SPBM port of the SPBM bridge where the determining unit 801 is located receives the IGMP member report packet from another SPBM bridge.

Figure 9:
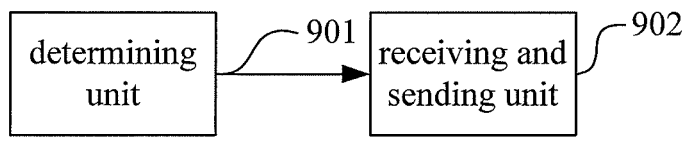
FIG. 9 is a schematic diagram illustrating the structure of a SPBM bridge that is neither connected to an IP multicast source nor an IP multicast member according to an example of the present disclosure.

The SPBM bridge may be used for implementing SPB based multicast forwarding. FIG. 9 is a schematic diagram illustrating the structure of a SPBM bridge that is neither connected to an IP multicast source nor an IP multicast member according to an example of the present disclosure. The SPBM bridge includes a determining unit 901 and a receiving and sending unit 902.

The determining unit 901 determines if the SPBM bridge where the determining unit 901 is located is a SPBM bridge that is neither connected to an IP multicast source nor an IP multicast member.

The receiving and sending unit 902, when the determining unit 901 determines that the SPBM bridge where the determining unit 901 is located is a SPBM bridge that is neither connected to an IP multicast source nor an IP multicast member, and when receiving a SPB-ISIS LSP that contains a multicast identity indicating that the SPBM bridge sending the SPB-ISIS LSP is connected to a multicast source, generates a SPBM multicast group address according to the SPSourceID contained in the SPB-ISIS LSP. The receiving and sending unit 902 performs SPT calculation and, when determining that the SPBM bridge where the receiving and sending unit 902 is located is a node in the SPT, configures the SPBM bridge's interface connected to the IP multicast source as an ingress of the SPBM multicast group. When receiving a SPB-ISIS LSP that contains a multicast identity indicating that the SPBM bridge sending the SPB-ISIS LSP is connected to an IP multicast member, the receiving and sending unit 902 performs SPT calculation. When determining that the SPBM bridge where the receiving and sending unit 902 is located is a node in the SPT, the receiving and sending unit 902 configures the SPBM bridge's interface connected to the IP multicast member as an egress of the SPBM multicast group. When a SPBM multicast frame is received from the ingress, the receiving and sending unit 902 forwards the SPBM multicast frame through the egress.

In an example, the determining unit 901 performs a multicast monitoring process. When it cannot determine if a local Ethernet port is a port of the IP multicast member of the IP multicast group and it cannot determine if a local Ethernet port is a port of the multicast router of the IP multicast group, the determining unit 901 determines the SPBM bridge where the determining unit 901 is located is a SPBM bridge that is neither connected to an IP multicast source nor an IP multicast member.

The modules or units in the above examples may be integrated into one body, or may be deployed separately; may be merged into one module or unit, or may be divided into multiple sub-modules or sub-units furthermore. The modules or units in the above examples may be implemented in a mechanical mode or an electrical mode. For example, one hardware module may include a special permanent circuit or logic appliance (e.g., a special processor such as FPGA or ASIC) for implementing specific operations. The hardware module may include programmable logic appliance or circuit configured temporarily by software to execute specific operations, e.g., include a general processor or other programmable processors. It may be determined according to time and cost whether the mechanical mode, the special permanent circuit or the circuit configured temporarily (configured by software) is adopted.

Figure 10:
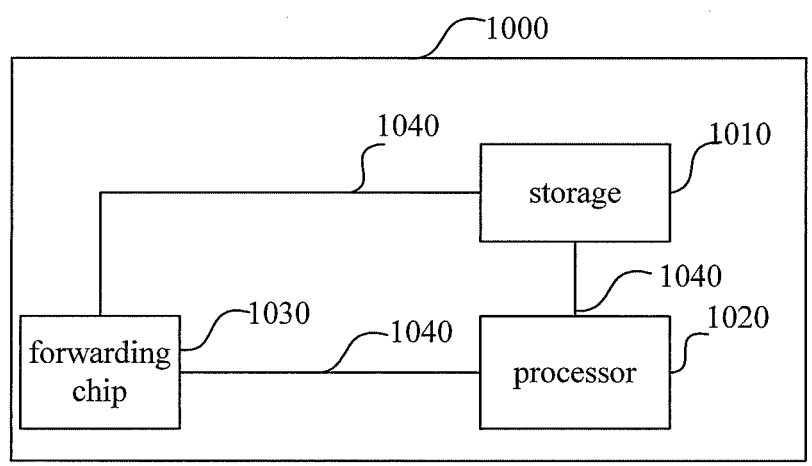
FIG. 10 is a schematic diagram illustrating the structure of a SPBM bridge 1000 for implementing multicast forwarding according to an example of the present disclosure.

The SPBM bridge has been described according to the examples in the above, and the hardware structure of the SPBM bridge will be illustrated hereinafter according to an example of the present disclosure. The SPBM bridge may be a programmable device implemented with hardware and software, referring FIG. 10. FIG. 10 is a schematic diagram illustrating the structure of a SPBM bridge 1000 for implementing multicast forwarding according to an example of the present disclosure. The SPBM bridge includes a storage 1010, a processor 1020, a forwarding chip 1030, and an interconnection structure 1040 coupling the storage 1010, the processor 1020 and the forwarding chip 1030.

The storage 1010 is to store instruction codes. When the instruction codes are executed, implemented operations include the functions implemented by the configuring unit, the determining unit and the selecting and generating unit of the SPBM bridge connected to the IP multicast source and the processing performed for packets including the SPB-ISIS LSP, the IGMP query packet and the IGMP member report packet, which are not be illustrated in detail here.

The processor 1020 is to communicate with the forwarding chip 1030 to receive and send packets; communicate with the storage 1010 to read and execute the instruction codes stored in the storage 1010, implement the functions implemented by the configuring unit, the determining unit and the selecting and generating unit and the processing for the packets sent by the forwarding chip 1030.

The forwarding chip 1030 is to connect to the router and other SPBM bridges through the Ethernet port and the SPBM port of the forwarding chip 1030, perform forwarding processing for the packets including the SPB-ISIS LSP, the IGMP query packet and the IGMP member report packet, receive and send the packets from and to the processor 1020.

It should be noted that, the SPBM bridge shown in FIG. 10 is only an example, which may have another structure different from that described by the example. For example, the operations implemented by the above instruction codes may be implemented by a specific an Application Specific Integrated Circuit (ASIC) or a Network Processor (NP). In addition, there may be one or more above processors 1020. If there are more processors, the more processors read and execute the instruction codes together. The structure of the SPBM bridge is not limited in this disclosure.

To sum up, bridges in the SPBM network perform the multicast monitoring process, learn about the router and members of the IP multicast group, and notify other bridges in the SPBM network of the information through the SPB-ISIS LSP. Each SPBM bridge in the SPBM network receives and parses the SPB-ISIS LSP, and configures the ingress and egress of the bridge, so as to optimize the forwarding of the IP multicast packets, and avoid any IP multicast packet reaching a SPBM bridge having no IP multicast member.

The foregoing is only some examples and is not used to limit the protection scope of this disclosure. Any modification, equivalent substitution and improvement without departing from the spirit and principle of this disclosure are within the scope of this disclosure.

What is claimed is:

1. A Shortest Path Bridging (SPB) based multicast forwarding method for a first Shortest Path Bridging MAC (SPBM) bridge, the method comprising:
when the first SPBM bridge determines it is a SPBM bridge connected to an Internet Protocol (IP) multicast source of an IP multicast group:
selecting, by the first SPBM bridge, a first Shortest Path Source Identification (SPSourceID) for the IP multicast group from multiple SPSourceIDs preallocated to the first SPBM bridge;
generating a first SPBM multicast group address of the IP multicast group according to the first SPSourceID;
sending other SPBM bridges a first SPB-Intermediate System to Intermediate System (ISIS) Link Status Packet (LSP) that contains the first SPSourceID and a first multicast identity indicating that the first SPBM bridge is connected to the IP multicast source;
when receiving a second SPB-ISIS LSP that contains a second multicast identity indicating that a second SPBM bridge sending the second SPB-ISIS LSP is connected to an IP multicast member of the IP multicast group, configuring the first SPBM bridge's interface connected to the IP multicast member as an egress of a SPBM multicast group; and
when receiving a first IP multicast packet sent by the IP multicast source, encapsulating the first IP multicast packet into a first SPBM multicast frame according to the first SPBM multicast group address and forwarding the first SPBM multicast frame through the egress.

2. The method of claim 1, further comprising:
when the first SPBM bridge determines it is a SPBM bridge connected to the IP multicast member:
sending, by the first SPBM bridge, the other SPBM bridges a third SPB-ISIS LSP that contains a third multicast identity indicating that the first SPBM bridge is connected to the IP multicast member;
when receiving a fourth SPB-ISIS LSP that contains a second SPSourceID and a fourth multicast identity indicating that the second SPBM bridge sending the fourth SPB-ISIS LSP is connected to the IP multicast source, generating a second SPBM multicast group address according to the second SPSourceID contained in the fourth SPB-ISIS LSP and configuring the first SPBM bridge's interface connected to the IP multicast source as an ingress of the SPBM multicast group;
when receiving a second SPBM multicast frame from the ingress of the SPBM multicast group, decapsulating the second SPBM multicast frame into a second IP multicast packet, and forwarding the second IP multicast packet to the IP multicast member.

3. The method of claim 1, wherein the first SPBM bridge determines it is a SPBM bridge connected to the IP multicast source by:
monitoring an Internet Group Management Protocol (IGMP) query packet sent by a multicast router, and, when a local Ethernet port of the first SPBM bridge receives the IGMP query packet, learning that the local Ethernet port is a port of the multicast router of the IP multicast group; and
performing a multicast monitoring process, and, when learning that the local Ethernet port is the port of the multicast router of the IP multicast group, determining that the first SPBM bridge is a SPBM bridge connected to the IP multicast source.

4. The method of claim 3, further comprising:
monitoring an IGMP member report packet sent by the IP multicast member, and, when a local SPBM port of the first SPBM bridge receives the IGMP member report packet, learning that the local SPBM port is a port of the IP multicast member of the IP multicast group, wherein the local SPBM port is the first SPBM bridge's interface connected to the IP multicast member.

5. The method of claim 2, wherein the first SPBM bridge determines it is a SPBM bridge connected to the IP multicast member comprises:
monitoring an IGMP member report packet sent by the IP multicast member, and, when a local Ethernet port of the first SPBM bridge receives the IGMP member report packet, learning that the local Ethernet port is a port of the IP multicast member of the IP multicast group; and
performing a multicast monitoring process, and, when learning that the local Ethernet port is the port of the IP multicast member of the IP multicast group, determining that the first SPBM bridge is a SPBM bridge connected to the IP multicast member.

6. The method of claim 5, further comprising:
monitoring an IGMP query packet sent by a multicast router, and, when a local SPBM port of the first SPBM bridge receives the IGMP query packet, learning that the local SPBM port is a port of the multicast router of the IP multicast group, wherein the local SPBM port is the first SPBM bridge's interface connected to the IP multicast source.

7. The method of claim 1, further comprising:
when the first SPBM bridge determines it is a SPBM bridge that is neither connected to the IP multicast source nor the IP multicast member, and the first SPBM receives a fifth SPB-ISIS LSP that contains a third SPSourceID and a fifth multicast identity indicating that a third SPBM bridge is connected to the IP multicast source:
generating a third SPBM multicast group address according to the third SPSourceID contained in the fifth SPB-ISIS LSP;
performing Shorted Path Tree (SPT) calculation, and, when the first SPBM bridge determines it is a node in a SPT, configuring the first SPBM bridge's interface connected to the IP multicast source as an ingress of the SPBM multicast group;
when receiving a sixth SPB-ISIS LSP that contains a sixth multicast identity indicating that a third SPBM bridge sending the sixth SPB-ISIS LSP is connected to the IP multicast member, performing SPT calculation, and, when the first SPBM bridge determines it is a node in another SPT, configuring the first SPBM bridge's interface connected to the IP multicast member as an egress of the SPBM multicast group;
when receiving the SPBM multicast frame from the ingress, forwarding the SPBM multicast frame through the egress.

8. The method of claim 7, wherein the first SPBM determines it is a SPBM bridge that is neither connected to the IP multicast source nor the IP multicast member by:
performing a multicast monitoring process, and, when the first SPBM does not learn that a local Ethernet port of the first SPBM bridge is a port of the IP multicast member of the IP multicast group and the first SPBM does not learn that the local Ethernet port is a port of the multicast router of the IP multicast group, determining that the first SPBM bridge is a SPBM bridge that is neither connected to the IP multicast source nor the IP multicast member.

9. A first Shortest Path Bridging MAC (SPBM) bridge, applied to Shortest Path Bridging (SPB) based multicast forwarding, comprising: a configuring unit to run a Shortest Path Source Identification (SPSourceID) allocation protocol to preallocate multiple SPSourceIDs to the first SPBM bridge;
  a determining unit to determine that the first SPBM bridge is a SPBM bridge connected to an Internet Protocol (IP) multicast source of an IP multicast group;
  a selecting and generating unit to, when the determining unit determines that the first SPBM bridge is a SPBM bridge connected to the IP multicast source, select a SPSourceID for the IP multicast group from the multiple SPSourceIDs preallocated by the configuring unit, and generate a SPBM multicast group address of the IP multicast group according to the selected SPSourceID; and
  a receiving and sending unit to:
    send other SPBM bridges a first SPB-Intermediate System to Intermediate System (ISIS) Link Status Packet (LSP) that contains the selected SPSourceID and a first multicast identity indicating that the first SPBM bridge is connected to the IP multicast source;
    when receiving a second SPB-ISIS LSP that contains a second multicast identity indicating that a second SPBM bridge sending the second SPB-ISIS LSP is connected to an IP multicast member of the IP multicast group, configure the first SPBM bridge's interface connected to the IP multicast member as an egress of a SPBM multicast group; and
    when receiving an IP multicast packet sent by the IP multicast source, encapsulate the IP multicast packet into a SPBM multicast frame according to the SPBM multicast group address, and forward the SPBM multicast frame through the egress.

10. The first SPBM bridge of claim 9, wherein the determining unit is to:
  monitor an IGMP query packet sent by a multicast router, and when a local Ethernet port of the first SPBM bridge receives the IGMP query packet, learn that the local Ethernet port is a port of the multicast router of the IP multicast group;
  perform a multicast monitoring process, and, when learning that the local Ethernet port is a port of the multicast router of the IP multicast group, determine that the first SPBM bridge is a SPBM bridge connected to the IP multicast source.

11. The first SPBM bridge of claim 10, wherein the determining unit is further to:
  monitor an IGMP member report packet sent by the IP multicast member; and
  when a local SPBM port of the first SPBM bridge receives the IGMP member report packet, learn information that the local SPBM port is a port of the IP multicast member of the IP multicast group, wherein the local SPBM port is the first SPBM bridge's interface connected to the IP multicast member.

12. A first Shortest Path Bridging MAC (SPBM) bridge, applied to Shortest Path Bridging (SPB) based multicast forwarding, comprising:
  a determining unit to determine that the first SPBM bridge is a SPBM bridge connected to an Internet Protocol (IP) multicast member of an IP multicast group; and
  a receiving and sending unit to:
    when the determining unit determines that the first SPBM bridge is a SPBM bridge connected to the IP multicast member, send other SPBM bridges a first SPB-ISIS LSP that contains a first multicast identity indicating that the first SPBM bridge is connected to the IP multicast member;
    when receiving a second SPB-Intermediate System to Intermediate System (ISIS) Link Status Packet (LSP) that contains a Shortest Path Source Identification (SPSourceID) and a second multicast identity indicating that a second SPBM bridge sending the second SPB-ISIS LSP is connected to an IP multicast source of the IP multicast group, generate a SPBM multicast group address according to the SPSourceID contained in the second SPB-ISIS LSP, and configure the first SPBM bridge's interface connected to the IP multicast source as an ingress of a SPBM multicast group; and
    when receiving a SPBM multicast frame through the ingress of the SPBM multicast group, decapsulate the SPBM multicast frame into an IP multicast packet, and forward the IP multicast packet to the IP multicast member.

13. The SPBM bridge of claim 12, wherein the determining unit is to:
  monitor an Internet Group Management Protocol (IGMP) member report packet sent by a multicast router, and, when a local Ethernet port of the first SPBM bridge receives the IGMP member report packet, learn information that the local Ethernet port is a port of the IP multicast member of the IP multicast group;
  perform a multicast monitoring process, and, when learning that the local Ethernet port is a port of the IP multicast member of the IP multicast group, determine that the first SPBM bridge is a SPBM bridge connected to the IP multicast member.

14. The SPBM bridge of claim 13, wherein the determining unit is further to:
  monitor an IGMP query packet sent by the multicast router;
  when a local SPBM port of the first SPBM bridge receives the IGMP query packet, learn information that the local SPBM port is a port of the multicast router of the IP multicast group, wherein the local SPBM port is the SPBM bridge's interface connected to the IP multicast source.

15. A first Shortest Path Bridging MAC (SPBM) bridge, applied to Shortest Path Bridging (SPB) based multicast forwarding, comprising:
  a determining unit to determine that the first SPBM bridge is a SPBM bridge that is neither connected to an IP multicast source nor an IP multicast member of an IP multicast group; and
  a receiving and sending unit to:
    when the determining unit determines that the first SPBM bridge is a SPBM bridge that is neither connected to the IP multicast source nor the IP multicast member, and receives a first SPB-Intermediate System to Intermediate System (ISIS) Link Status Packet (LSP) that contains a Shortest Path Source Identification (SPSourceID) and a first multicast identity indicating that a second SPBM bridge is connected to the multicast source, generate a SPBM multicast group address according to the SPSourceID contained in the first SPB-ISIS LSP;
    perform SPT calculation, and, when determining that the first SPBM bridge is a node in a SPT, configure the first SPBM bridge's interface connected to the IP multicast source as an ingress of a SPBM multicast group;

when receiving a second SPB-ISIS LSP that contains a multicast identity indicating that a third SPBM bridge sending the second SPB-ISIS LSP is connected to the IP multicast member:
  perform SPT calculation, and, when determining that the first SPBM bridge is a node in another SPT, configure the first SPBM bridge's interface connected to the IP multicast source as an egress of the SPBM multicast group; and
  when receiving an SPBM multicast frame from the ingress, forward the SPBM multicast frame through the egress; and
wherein the determining unit is to perform a multicast monitoring process, and, when the determining unit does not learn that a local Ethernet port of the first SPBM bridge is a port of the IP multicast member of the IP multicast group and that the local Ethernet port is a port of a multicast router of the IP multicast group, determine that the first SPBM bridge is a SPBM bridge that is neither connected to the IP multicast source nor the IP multicast member.

* * * * *